United States Patent
Takashima

(10) Patent No.: US 10,866,107 B2
(45) Date of Patent: Dec. 15, 2020

(54) NAVIGATION SYSTEM

(71) Applicant: DENSO CORPORATION, Kariya (JP)

(72) Inventor: Ryo Takashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 15/768,938

(22) PCT Filed: Sep. 19, 2016

(86) PCT No.: PCT/JP2016/077604
§ 371 (c)(1),
(2) Date: Apr. 17, 2018

(87) PCT Pub. No.: WO2017/068897
PCT Pub. Date: Apr. 27, 2017

(65) Prior Publication Data
US 2018/0299281 A1 Oct. 18, 2018

(30) Foreign Application Priority Data
Oct. 19, 2015 (JP) ................ 2015-205797

(51) Int. Cl.
*G01C 21/34* (2006.01)
*G09B 29/10* (2006.01)
(Continued)

(52) U.S. Cl.
CPC ..... *G01C 21/3484* (2013.01); *G01C 21/3664* (2013.01); *G01C 21/3676* (2013.01);
(Continued)

(58) Field of Classification Search
CPC ............ G01C 21/3484; G01C 21/3676; G01C 21/3664; G08G 1/096838; G08G 1/096866; G08G 1/0969; G09B 29/10; G09B 29/106
See application file for complete search history.

(56) References Cited

U.S. PATENT DOCUMENTS

2006/0235615 A1* 10/2006 Kato .................... B60W 40/04
701/300
2012/0046841 A1* 2/2012 Wurthner .............. B60W 10/02
701/54
(Continued)

FOREIGN PATENT DOCUMENTS

JP 2000304561 A 11/2000
JP 3671734 B2 7/2005
(Continued)

*Primary Examiner* — Behrang Badii
*Assistant Examiner* — Daniel L Greene
(74) *Attorney, Agent, or Firm* — Harness, Dickey & Pierce, P.L.C.

(57) ABSTRACT

A navigation ECU includes a route calculator section, an automated driving distance calculator section, and a display processor section. The route calculator section calculates a plurality of route candidates to a destination designated by a user. The automated driving distance calculator section calculates an automated driving enabled distance that is a distance of a road segment, where a vehicle is able to be run by an automated driving, with respect to each of the plurality of route candidates. The display processor section displays a route selection screen view containing the information which indicates an automated driving enabled distance versus a full length, with respect to each of the plurality of route candidates.

11 Claims, 5 Drawing Sheets

(51) Int. Cl.
    *G08G 1/0969*     (2006.01)
    *G01C 21/36*      (2006.01)
    *G08G 1/0968*     (2006.01)

(52) U.S. Cl.
    CPC ..... *G08G 1/0969* (2013.01); *G08G 1/096838* (2013.01); *G08G 1/096866* (2013.01); *G09B 29/10* (2013.01); *G09B 29/106* (2013.01)

(56) References Cited

U.S. PATENT DOCUMENTS

| | | | |
|---|---|---|---|
| 2014/0247439 A1* | 9/2014 | Neier | G01C 15/002 |
| | | | 356/4.01 |
| 2016/0298976 A1* | 10/2016 | Sato | G08G 1/096827 |
| 2016/0305787 A1* | 10/2016 | Sato | G05D 1/0088 |
| 2017/0010612 A1* | 1/2017 | Asakura | G01C 21/3461 |
| 2017/0106786 A1* | 4/2017 | Ebina | B62D 1/28 |

FOREIGN PATENT DOCUMENTS

| | | | |
|---|---|---|---|
| JP | 2015017944 A | 1/2015 |
| JP | 2015141052 A | 8/2015 |

\* cited by examiner

NAVIGATION SYSTEM

CROSS REFERENCE TO RELATED APPLICATIONS

This application is a U.S. National Phase Application under 35 U.S.C. 371 of International Application No. PCT/JP2016/077604 filed on Sep. 19, 2016 and published in Japanese as WO 2017/068897 A1 on Apr. 27, 2017. This application is based on and claims the benefit of priority from Japanese Patent Application No. 2015-205797 filed on Oct. 19, 2015. The entire disclosures of all of the above applications are incorporated herein by reference.

TECHNICAL FIELD

The present disclosure relates to a navigation system that presents a user of a vehicle with a plurality of route candidates to a destination designated by the user.

BACKGROUND ART

As disclosed in Patent literature 1, there is conventionally a navigation system which calculates a plurality of routes individually corresponding to a plurality of kinds of conditions, as a route to a destination designated by a user, using map data indicating the connection relation of a road network. The routes corresponding to the predetermined conditions include a route having a shortest distance, a route having a shortest travel period of time, and a route having a minimum economic cost.

Such a navigation system displays a screen view which enables a user to select a planned travel route, which is a route to be travelled actually, from a plurality of calculated routes. Of the plurality of routes, the route selected by the user is thus recognized as the planned travel route.

PRIOR ART LITERATURES

Patent Literature

Patent literature 1: JP 2000-304561 A

SUMMARY OF INVENTION

In recent years, a technology performing automatically a driving operation of a vehicle (i.e., automated driving technology) has been developed to be put to practical use. For convenience, the function of an automated driving technology automatically driving a vehicle is referred to as an automated driving function.

An initial stage of the automated driving technology predicts that a travel by an automated driving of a vehicle be permitted in a road such as an expressway having comparatively few merge/branch points with another vehicle earlier than in the other roads. As a result, during the progress where the automated driving is put to practical use, a road enabling the automated driving function (hereinafter, an automated driving compliant road) coexists with a road needing the driver's manual driving (hereinafter, manual driving road).

Such a coexisting situation of the automated driving compliant road and the manual driving road expects a user of the navigation system to want to arrive at a destination while performing a manual driving as little as possible. The conventional navigation system fails to teach a user a route allowing the user to perform a manual driving as little as possible for reaching a destination among a plurality of routes.

Note that the manual driving is not limited to a fully manual driving. The manual driving may include a driving operation of which a part is performed by a driver. The manual driving may further include a standby state in which a driver is ready to perform a manual driving depending on a peripheral traffic situation even when a driving operation has been performed automatically.

It is an object of the present disclosure to provide a navigation system allowing a user to select a route which reduces a work of the user in performing a manual driving.

To achieve the object, according to a first aspect of the present disclosure, a navigation system is provided to display candidates of routes to a destination, which is designated by a user, in a display used in a vehicle that the user uses. The navigation system includes: a destination acquirer section; a departure place acquirer section; a route calculator section; an automated driving compliant road memory; an automated driving distance calculator section; and a display processor section. The destination acquirer section acquires information on the destination. The departure place acquirer section acquires information on a departure place of the vehicle. The route calculator section calculates a plurality of routes as route candidates from the departure place acquired by the departure place acquirer section to the destination acquired by the destination acquirer section. The automated driving compliant road memory stores data that indicate automated driving compliant roads on which running by an automated driving is permitted. The automated driving distance calculator section calculates an automated driving enabled distance that is a distance of automated driving compliant roads that are included in each of the plurality of routes, based on the data stored in the automated driving compliant road memory. The display processor section displays on the display a route selection screen view used in order that the user selects a route adopted as a planned travel route from the plurality of routes calculated by the route calculator section; the route selection screen view illustrates information on the plurality of routes. Herein, the display processor section displays, in the route selection screen view, information on manual driving amount with respect to each of the plurality of routes; the information on manual driving amount is determined depending on the automated driving enabled distance calculated by the automated driving distance calculator section with respect to each of the plurality of routes; the information on manual driving amount is used in order that the user recognizes a distance or a period of time needed by the user to perform a manual driving in each of the plurality of routes.

Under the above, the route calculator section calculates a plurality of routes; the automated driving distance calculator section calculates, with respect to each of the routes, a distance of a road segment in which an automated driving is enabled to be used. The display processor section then displays the information on manual driving amount for each of the routes on a route selection screen view.

The information on manual driving amount displayed on the route selection screen view is the information, which is determined depending on an automated driving enabled distance and which allows a user to recognize a distance or a period of time needed for the user to perform a manual driving.

According to such a configuration, the user can compare a plurality of manual driving amounts with respect to respective routes, thereby selecting a route, which is reduced in respect of works for performing a manual driving, from the plurality of routes.

To achieve the above object, according to a second aspect of the present disclosure, a navigation system is provided to display candidates of routes to a destination, which is designated by a user, in a display used in a vehicle that the user uses. The navigation system includes: a destination acquirer section; a departure place acquirer section; a route calculator section; an automated driving compliant road memory; an automated driving distance calculator section; a minimum route identifier section; and a display processor section. The destination acquirer section acquires information on the destination. The departure place acquirer section acquires information on a departure place of the vehicle. The route calculator section calculates a plurality of routes as route candidates from the departure place acquired by the departure place acquirer section to the destination acquired by the destination acquirer section. The automated driving compliant road memory stores data that indicate automated driving compliant roads on which running by an automated driving is permitted. The automated driving distance calculator section calculates an automated driving enabled distance that is a distance of automated driving compliant roads that are included in each of the plurality of routes calculated by the route calculator section, based on the data stored in the automated driving compliant road memory. The minimum route identifier section identifies a load minimum route among the plurality of routes based on the automated driving enabled distance with respect to each of the plurality of routes calculated by the automated driving distance calculator section; the load minimum route is a route of which either a distance or a period of time needed for the user to perform a manual driving is minimum among the plurality of routes. The display processor section displays on the display a route selection screen view used in order that the user selects a route adopted as a planned travel route from the plurality of routes calculated by the route calculator section. Herein, the display processor section displays a minimum route selection button in the route selection screen view; the minimum route selection button is a button used in order that the user selects the load minimum route identified by the minimum route identifier section among the plurality of routes.

Under the above, the route calculator section calculates a plurality of routes; the automated driving distance calculator section calculates, with respect to each of the routes, a distance of a road segment in which an automated driving is enabled to be used. In addition, the minimum route identifier section identifies a route having a minimum necessity in performing a manual driving among the plurality of routes, based on the automated driving enabled distance for each of the plurality of routes. The display processor section then displays a minimum route selection button among the plurality of routes; the minimum route selection button is used for selecting a route having a minimum necessity in performing a manual driving among the plurality of routes.

Under such configuration, a user is enabled to designate a planned travel route as a route candidate having a minimum necessity in performing a manual driving among a plurality of routes by selecting a manual driving minimum button. That is, under such a configuration, the user is enabled to select a route, which is reduced in respect of works for performing a manual driving, from the plurality of routes.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
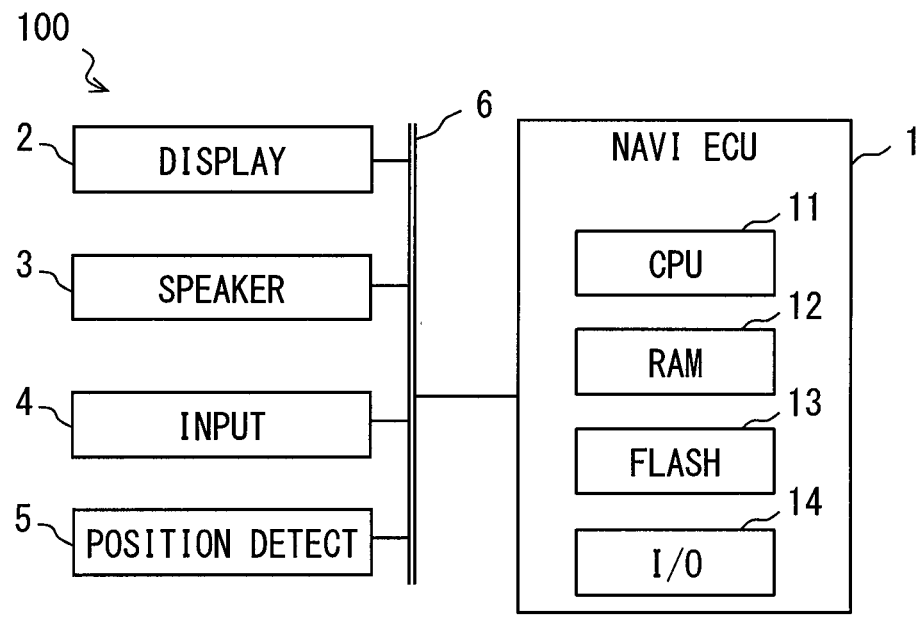
FIG. 1 is a block diagram illustrating an example of a schematic configuration of an in-vehicle system according to an embodiment.

The following describes an example of an embodiment of the present disclosure with reference to drawings. As illustrated in FIG. 1, an in-vehicle system 100 according to the present embodiment, which is mounted in a vehicle, includes a navigation ECU 1, a display 2, a speaker 3, an input apparatus 4, and a position detector 5. Here, ECU is an abbreviated word of Electronic Control Unit. The navigation ECU 1 is connected and communicated with each of the display 2, the speaker 3, the input apparatus 4, and the position detector 5, via a local area network (hereinafter, LAN) 6 built in the vehicle. Hereinafter, a vehicle in which the in-vehicle system 100 is mounted may be also referred to as a host vehicle. Furthermore, the host vehicle mounted with the in-vehicle system 100 may be also referred to as a subject vehicle for the following explanation.

The navigation ECU 1 is configured to be a known computer to include a CPU 11, a RAM 12, a flash memory 13, an I/O 14, and a bus line that connects the foregoing components. The RAM 12 functions as a primary storage apparatus (so-called memory) for the CPU 11. The flash memory 13 functions as an auxiliary storage apparatus (so-called a storage).

The flash memory 13 stores a program (hereinafter, a navigation program) for making a usual computer function as the navigation ECU 1. Note that the above-mentioned navigation program only needs to be stored in a non-transitory tangible storage medium such as a flash memory or ROM. Executing the navigation program by the CPU 11 corresponds to executing a method corresponding to the navigation program.

The navigation ECU 1 is an apparatus which assists a selection of a planned travel route by a user, and a driving operation in line with the planned travel route selected by the user, using the display 2 and/or the speaker 3. The details of the navigation ECU 1 are mentioned later separately.

The display 2 displays an image inputted from the navigation ECU 1. The display 2 is arranged near a center of an instrument panel, or in a combination meter arranged in front of a driver seat, for instance. The display 2, which may perform a full color display, is achieved by using a known liquid crystal display or organic electroluminescence display. The display 2 may also be a known head up display.

The speaker 3 outputs sounds according to the data inputted from the navigation ECU 1. In other words, the navigation ECU 1 uses the speaker 3 to output the sounds such as a predetermined speech message, sound effect, music.

The input apparatus 4 is an apparatus for receiving the user's instruction manipulation to the navigation ECU 1. For example, the input apparatus 4 may be a touch panel which is integrated to the display 2. As other examples, the input apparatus 4 may be a mechanical switch or a speech recognizer section equipped with a microphone unshown. In addition, the input apparatus 4 may be configured to include the foregoing apparatuses.

The position detector 5 detects a current position of the subject vehicle successively (each 100 milliseconds, for instance). This position detector 5 may be achieved using a receiver (hereinafter, GNSS receiver) used for GNSS (Global Navigation Satellite System), for example. The GNSS receiver is an apparatus for receiving the radio waves transmitted from the positioning satellites which configure the GNSS, to thereby identifying the position of the GNSS receiver. It is noted that the position detector 5 may be configured to perform a process (so-called, Dead Reckoning) which estimates a current position using detection values from sensors such as a yaw rate sensor, an acceleration sensor.

The position detector 5 provides a detection result that indicates the information on current position of the subject vehicle; the information may be represented by coordinates of latitude and longitude, for example. The current position detected by the position detector 5 is provided to the navigation ECU 1 successively. Note that "information," which may be used not only as an uncountable noun but also a countable noun, is equivalent to an informational item. One information is equivalent to one informational item; a plurality of informations are equivalent to a plurality of informational items. Further, "data" is used also as one data or a plurality of data. One data is equivalent to one data item; a plurality of data are equivalent to a plurality of data items.

<Navigation ECU 1>

Figure 2:
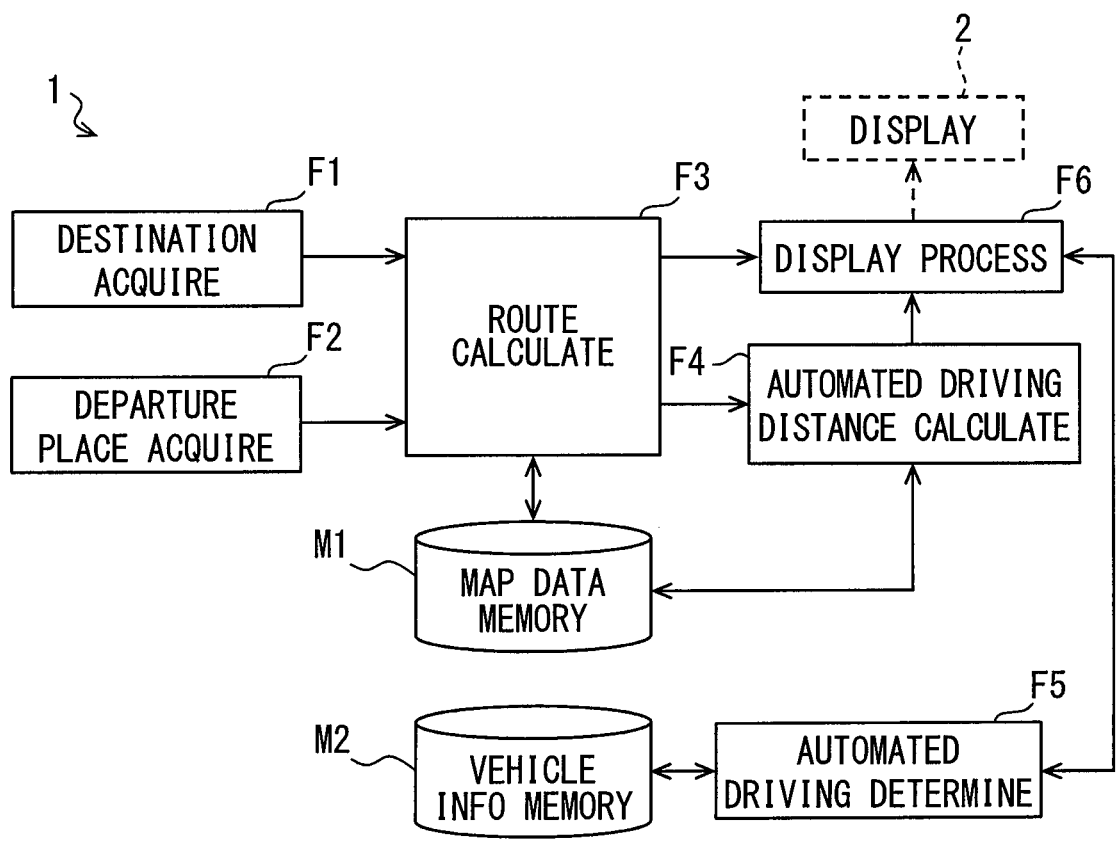
FIG. 2 is a functional block diagram illustrating a configuration of a navigation ECU.

The following explains a function included in the navigation ECU 1 with reference to FIG. 2. The navigation ECU 1 is a device equivalent to a so-called navigation apparatus, which provides a guidance along a planned travel route designated by a user. That is, the navigation ECU 1 is provided with a function as a known navigation apparatus. Note that the explanation will omit the part irrelevant to a selection of routes from the functions of such a known navigation ECU.

The navigation ECU 1 includes a destination acquirer section F1, a departure place acquirer section F2, a route calculator section F3, an automated driving distance calculator section F4 (which may also be referred to as an automated driving enabled distance calculator section), an automated driving determiner section F5 (which may also be referred to as an automated driving enabled or disabled determiner section, and a display processor section F6, as indicated in FIG. 2 as functional blocks achieved by the CPU 11 executing the navigation program. Note that each of the functional blocks included in the navigation ECU 1 may be also achieved as hardware circuits such as one or more ICs. The navigation ECU 1 is equivalent to a navigation system.

In addition, the navigation ECU 1 includes a map data memory M1 (which may also be referred to as a map data storage), and a vehicle information memory M2 (which may also be a vehicle information storage).

The map data memory M1 stores map data. The map data include road data indicating the connection relations (i.e., road network) of roads, background data, text data, speech data, and data of images such as 2D images, 3D images, or polygon images.

The road data include (i) node data about each spot (hereinafter, node) at which a plurality of roads intersect, merge, or branch; and (ii) link data about each road (hereinafter, link) which connects neighboring spots. The spot designated as a node is not limited to a spot at which a plurality of roads intersect, merge, or branch. The node further includes a dead end spot of a road, a spot at which the class of a road changes, a start point or an end point of a toll road segment, and a spot in a road network designated for convenience.

The node data relative to each node include data such as a node ID assigned with a number unique to the node, node coordinates, a node name, connection link IDs for indicating all the links connected to the node, an intersection class. The coordinates of the node may be represented by coordinates of latitude and longitude, for example.

The link data relative to each link include data such as a link ID assigned with a number unique to the link, a link length indicating a length of the link, a start end node and a terminating end node of the link, a road class such as expressway or general road, a road width, a link orientation, a road name, the number of lanes, a regulated speed limit. In addition, the link data with respect to each link is provided with a data that indicates whether such a link allows a travel by an automated driving function (hereinafter, automated travel).

The above automated driving function includes functions to perform automatically steering, acceleration, or deceleration, so as to enable the subject vehicle to travel along the planned travel route designated by the user. Note that, the travel by the automated driving function (i.e., an automated travel) may be performed when the following cases are simultaneously satisfied: (i) the automated driving function is validated by the user; (ii) the planned travel route is designated by the user; and (iii) the subject vehicle is present on the road where the automated travel is permitted.

In the following, a road in which an automated travel is permitted among various roads (i.e., links), which are included in a road network, is referred to as an automated driving compliant road, for convenience. The roads defined as automated driving compliant roads among the various roads may be designated by an administrative entity. The present embodiment assumes that toll roads such as expressways be defined as automated driving compliant roads, for instance.

The background data associate facilities or land forms with corresponding coordinates on the map. In addition, the facilities are associated with telephone numbers or addresses etc. which are also stored. Moreover, the text data are used to display place names, facility names, road names, etc. on the map, and associated with data of coordinates corresponding to positions for display on the map. The speech data are data for outputting speeches. The image data, which are data for drawing images displayed on the display 2, include the data for drawing a route selection screen view, for instance. The screen view, which is an image which appears in a screen surface of the display 2, is also referred to as a window or a display window.

The vehicle information memory M2 stores the data which indicates whether the subject vehicle is a vehicle (i.e., a host vehicle) in which an automated driving function is mounted. The data which indicates whether the subject vehicle is a vehicle (i.e., a host vehicle) which is mounted with an automated driving function may be registered into the vehicle information memory M2 by a user or a dealer.

The map data memory M1 and the vehicle information memory M2 may be achieved using a non-volatile storage medium. The present embodiment assumes that the map data memory M1 and the vehicle information memory M2 be each achieved using the flash memory 13 included in the navigation ECU 1, for instance. As an alternative example, the map data memory M1 and the vehicle information memory M2 may be each achieved using any storage medium other than the flash memory 13. For example, the map data memory M1 may be achieved using a hard disk drive (i.e., HDD), or an optical storage medium.

Note that the map data memory M1 stores, as part of the map data, the data which indicate automated driving compliant roads. The map data memory M1 is therefore equivalent to an automated driving compliant road memory.

The destination acquirer section F1 acquires the information on the spot which the user designates as a destination via the input apparatus 4. The departure place acquirer section F2 acquires the information on the spot (that is, departure place) serving as a start point when calculating a route candidate to the destination. The departure place may be a current position acquired by the position detector 5. It is noted that the departure place may be not only a current position but also a spot designated by the user via the input apparatus 4.

The route calculator section F3 calculates candidates of routes from the departure place to the destination based on the map data which the map data memory M1 stores. The present embodiment assumes that the route calculator section F3 calculate a plurality of routes corresponding to a plurality of kinds of conditions as candidates of routes from the departure place to the destination, for example. In detail, the route calculator section F3 calculates the following: a recommended route that is simplest in respect of configuration of a route; a toll road prioritized route that uses toll roads preferentially; a general road prioritized route that suppresses the use of toll roads; a distance prioritized route of which a travel movement distance is the minimum; and an alternative route that adopts preferentially a link that other candidates of routes do not contain.

A method for calculating a route which gives priority to a predetermined condition may employ a known one. Such a route which gives priority to a predetermined condition may be retrieved using the Dijkstra method making the weight (so-called cost) given to each link or node smaller as it matches with the predetermined condition more.

The information (hereinafter, route information) about each of a plurality of routes (hereinafter, route candidates), which the route calculator section F3 calculates as a candidate of the route (hereinafter, planned travel route) the subject vehicle actually travels, is provided to the automated driving distance calculator section F4 and the display processor section F6. The route information may preferably contain the data such as: the information on the links and nodes included in the route candidate; the travel movement distance from the departure place to the destination (that is, the route candidate's full length); and the predicted value of a period of time needed to arrive at the destination. In addition, the route information may contain the condition to which the priority is given when retrieving the route.

The condition used when calculating the route candidate is not limited to the mentioned above. For instance, the route calculator section F3 calculates, as one route candidate, a time prioritized route providing a predicted value of a smallest period of time needed for traveling from the departure place to the destination. The route calculator section F3 further calculates, as one route candidate, a route providing a minimum value in an overall economic cost that is a sum of a price for toll roads and a cost for consumed fuel and/or consumed electric power. Note that the configuration of a route being simple is equivalent to the route having a relatively small number of left or right turns.

The present embodiment calculates a plurality of route candidates so as to give a priority to mutually different respective conditions. However, there is no need to be limited thereto. For instance, a plurality of route candidates may be calculated with respect to one condition.

The automated driving distance calculator section F4 calculates a total value of the lengths of road segments corresponding to the automated driving compliant roads among the roads included in each of the route candidates calculated by the route calculator section F3. The total value of the lengths of road segments corresponding to the automated driving compliant roads among the roads included in a certain route candidate is equivalent to an automated driving enabled distance that is a distance in which an automated driving is enabled in such a certain route candidate. The automated driving enabled distance in the certain route candidate may be specified by accumulating the lengths of the links corresponding to the automated driving compliant roads while referring sequentially to the link data of the links included in the certain route candidate.

The automated driving enabled distance for each route candidate calculated by the automated driving distance calculator section F4 is provided to the display processor section F6 while being associated with each route candidate.

The automated driving determiner section F5 determines whether the subject vehicle is a host vehicle, which an automated driving function is mounted in, with reference to the vehicle information memory M2. The determination result by the automated driving determiner section F5 is provided to the display processor section F6. The present embodiment performs the above determination by the automated driving determiner section F5 referring to the vehicle information memory M2 that stores the information indicating whether the subject vehicle is a host vehicle mounted with an automated driving function, for instance. However, there is no need to be limited thereto.

As another example, the automated driving determiner section F5 may acquire the information indicating that the subject vehicle is a host vehicle mounted with an automated driving function (hereinafter, automated driving compliant vehicle) from a different ECU connected to the LAN 6. For instance, when detecting an ECU providing an automated driving function is connected with the LAN 6, it may be determined that the subject vehicle is an automated driving compliant vehicle. In contrast, when failing to detect any ECU providing an automated driving function is connected with the LAN 6, it may be determined that the subject vehicle is not an automated driving compliant vehicle.

The display processor section F6 generates an image displayed on the display 2. For example, the display processor section F6 generates an image data for displaying on the display 2 as a route selection screen view based on the route information provided from the route calculator section F3. The display processor section F6 then outputs the generated image data to the display 2 to display. That is, the display processor section F6 controls the display screen view on the display 2.

Note that the route selection screen view is a screen view for the user to select the route candidate adopted as a planned travel route from a plurality of route candidates. For example, the route selection screen view may be a screen view which illustrates a schematic shape of each route candidate on a map image while being assigned with a button (hereinafter, a route selection button) to adopt each of route candidates as a planned travel route. The details of the route selection button is mentioned later.

<Route Candidate Display Process>

Figure 3:
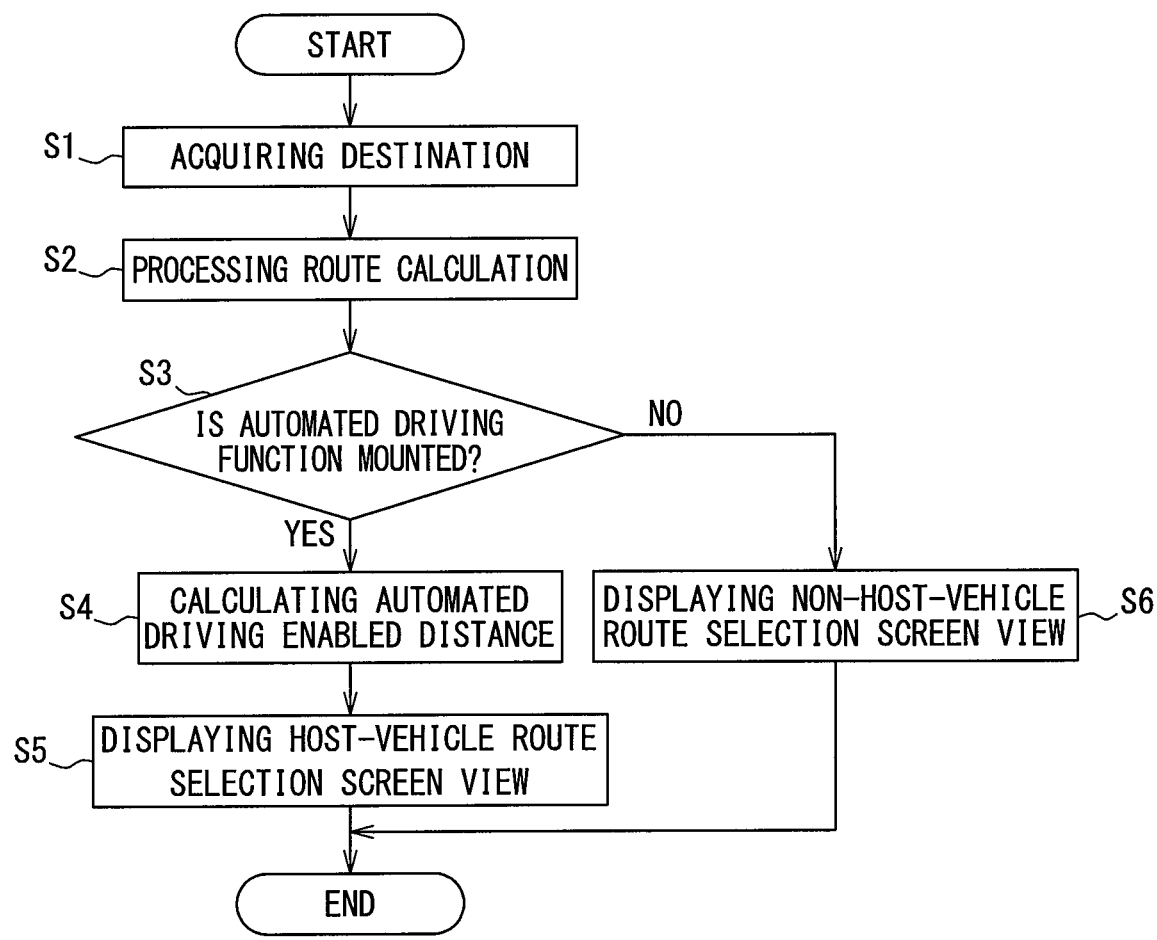
FIG. 3 is a flowchart for explaining a route candidate display process.

The following explains a route candidate display process executed by the present navigation ECU 1 with reference to a flowchart indicated in FIG. 3. The route candidate display process signifies a series of processing executed by the navigation ECU 1 in order to display the route selection screen view which illustrates a plurality of route candidates on the display 2. The flowchart indicated in FIG. 3 may be started when a control signal which indicates that an input manipulation of the destination by the user is completed is inputted from the input apparatus 4.

It is further noted that a flowchart to be described includes sections (also referred to as steps), which are represented, for instance, as S1. Further, each section can be divided into several sections while several sections can be combined into a single section. Each section may be referred to as a device or a specific name, or with a structure modification; for instance, a route calculator section may be also referred to as a route calculator device or a route calculator. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

First, at S1, the destination acquirer section F1 acquires a destination which the user inputs via the input apparatus 4; then, the sequence proceeds to S2. At S2, the route calculator section F3 calculates a plurality of route candidates from a departure place to the destination. The route information for each calculated route candidate is provided to the automated driving distance calculator section F4 and the display processor section F6; then the sequence proceeds to S3.

At S3, the automated driving determiner section F5 determines whether the subject vehicle is an automated driving compliant vehicle with reference to the vehicle information memory M2. When the subject vehicle is an automated driving compliant vehicle, an affirmative determination is made at S3; then, the sequence proceeds to S4. When the subject vehicle is not an automated driving compliant vehicle, a negative determination is made at S3; then, the sequence proceeds to S6.

At S4, the automated driving distance calculator section F4 calculates an automated driving enabled distance with respect to each of the route candidates. The calculated automated driving enabled distance is provided to the display processor section F6 while being associated with each route candidate. When S4 is completed, the sequence proceeds to S5.

At S5, the display processor section F6 generates a route selection screen view (hereinafter, a host-vehicle route selection screen view) for a host vehicle mounted with an automated driving function, displaying it on the display 2. The present flowchart is then ended.

The host-vehicle route selection screen view is a screen view illustrating the information on manual driving amount, in addition to a schematic shape of each route candidate and a route selection button; the information on manual driving amount indicates explicitly or implicitly a distance or a period of time, which is determined according to an automated driving enabled distance and which is needed for travel by a manual driving of the user with respect to each route candidate.

Figure 4:
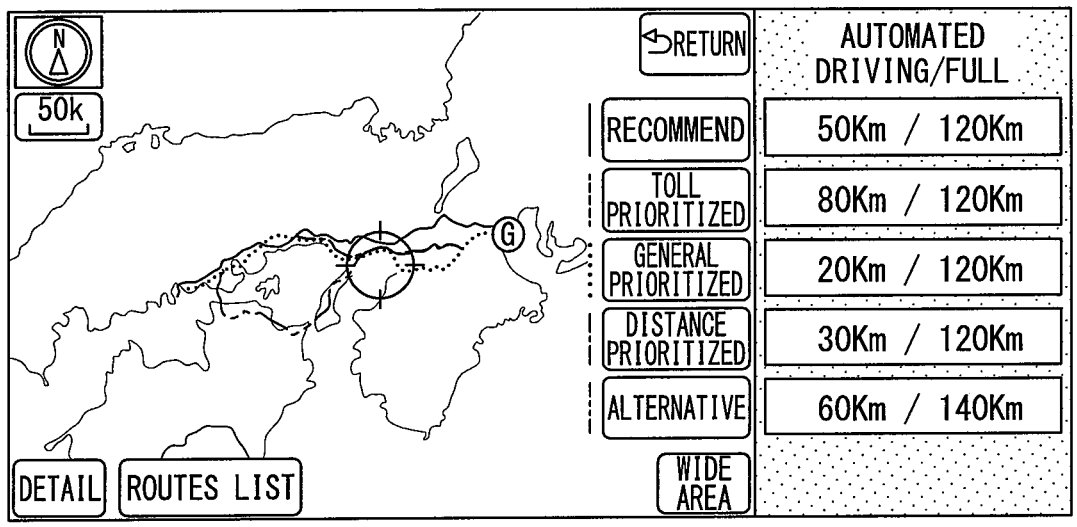
FIG. 4 is a diagram illustrating an example of a route selection screen view.

For example, the host-vehicle route selection screen view may be, as in FIG. 4, a screen view illustrating a full length and an automated driving enabled distance with respect to each route candidate as the information on manual driving amount for each route candidate. FIG. 4 illustrates an example that illustrates both a full length and an automated driving enabled distance relative to each route candidate on the right side of the route selection button for each route candidate.

In more detail, FIG. 4 indicates that a toll road prioritized route has a full length of 120 km of which 80 km corresponds to an automated driving compliant road. In other words, it indicates that the user needs to perform a manual driving for 40 km out of 120 km.

Note that the above manual driving is not limited to a thorough manual driving, but may include an example in which part of a driving operation is performed by the user. The manual driving may further include a standby state in which a driver is ready to perform a manual driving depending on a peripheral traffic situation even when a driving operation has been performed automatically.

According to the present embodiment, the user can compare a plurality of the information on manual driving amounts for the respective route candidates, thereby identifying a route providing a minimum value of a distance or a period of time needed for performing a manual driving. That is, the above configuration enables the user to select the route having a relatively small need of performing a manual driving.

For convenient, in FIG. 4, schematic shapes of respective route candidates are illustrated to distinguish from each other using a plurality of kinds of lines such as a double line, a broken line, a one-dot chain line, or a two-dot chain line, but may be illustrated to be distinguished from each other using different colors actually. Each route selection button may be assigned with a text or icon image representing a condition used for calculating each route candidate.

At S6, a route selection screen view is displayed which contains an map image which indicates a schematic locus for each route candidate and a route selection button corresponding to each route candidate. That is, when an automated driving function is not mounted in the subject vehicle, a usual route selection screen view is displayed. Such a usual route selection screen view is equivalent to a route selection screen view which does not include the information on manual driving amount.

Summary of Embodiment

Under the above configuration, when a subject vehicle is a host vehicle in which an automated driving function is mounted, a host-vehicle route selection screen view, which contains the information on manual driving amount, is displayed as a screen view (that is, a route selection screen view) for the user to determine a planned travel route.

The information on manual driving amount for each route candidate displayed in the host-vehicle route selection screen view indicates a distance or a period of time, which is determined depending on an automated driving enabled distance and which is needed by the user to perform a manual driving for travel of the vehicle, as mentioned above.

According to such a configuration, the user can compare a plurality of the information on manual driving amounts for the respective route candidates, thereby identifying the route providing a minimum value of a distance or a period of time needed for performing a manual driving. That is, the above configuration enables the user to select the route having a relatively reduced necessity of performing a manual driving.

Further, under the above configuration, when a subject vehicle is not a host vehicle mounted with an automated driving function, a non-host-vehicle route selection screen view, which does not contain any information on manual driving amount, is displayed as a screen view (that is, route selection screen view) for the user to determine a planned travel route.

This is because the information on manual driving amount for each route candidate is unnecessary for a user of a vehicle in which any automated driving function is not mounted. If such unnecessary information is displayed, there is a risk of giving the user a troublesomeness after all. In contrast, the configuration of the present embodiment can reduce such a risk of giving the user a troublesomeness.

The embodiment of the present disclosure is described in the above; however, the present disclosure is not limited to the above embodiment. The following modification examples are also included in a technical scope of the present disclosure; furthermore, another modification example other than the following is also executable as long as not deviating from a subject matter.

Note that a component having the same function as that of the component explained in the above embodiment is assigned with the same reference number and omitted from the following explanation. When only part of a configuration of each modification example is explained, the other part of the configuration may adopt those of the embodiment previously explained.

First Modification Example

Figure 5:
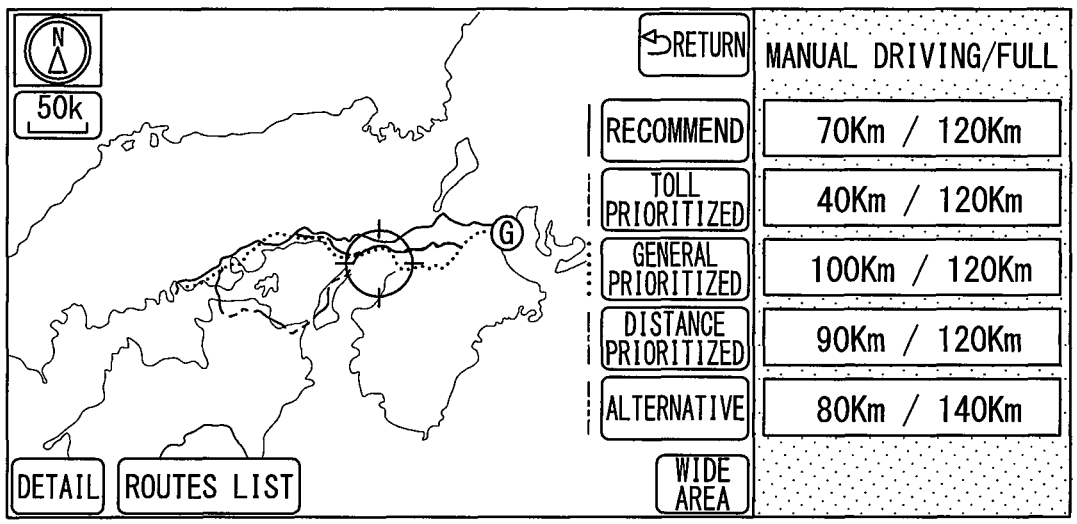
FIG. 5 is a diagram illustrating an example of a route selection screen view according to a modification example.

The above embodiment describes an example of a configuration that displays, as the information on manual driving amount, an automated driving enabled distance and a full length of each of a plurality of route candidates. There is no need to be limited thereto. As indicated in FIG. 5, a manual driving distance and a full length of each of a plurality of route candidates may be displayed as the information on manual driving amount. A manual driving distance in a certain route candidate represents, within the certain route candidate, the length of a road segment in which the user needs to perform a manual driving. In other words, a manual driving distance in the certain route candidate is a total value of the lengths of the links, which are not automated driving compliant roads, out of all the links included in the certain route candidate. The manual driving distance may be obtained by subtracting an automated driving enabled distance from the full length of the route.

Second Modification Example

Figure 6:
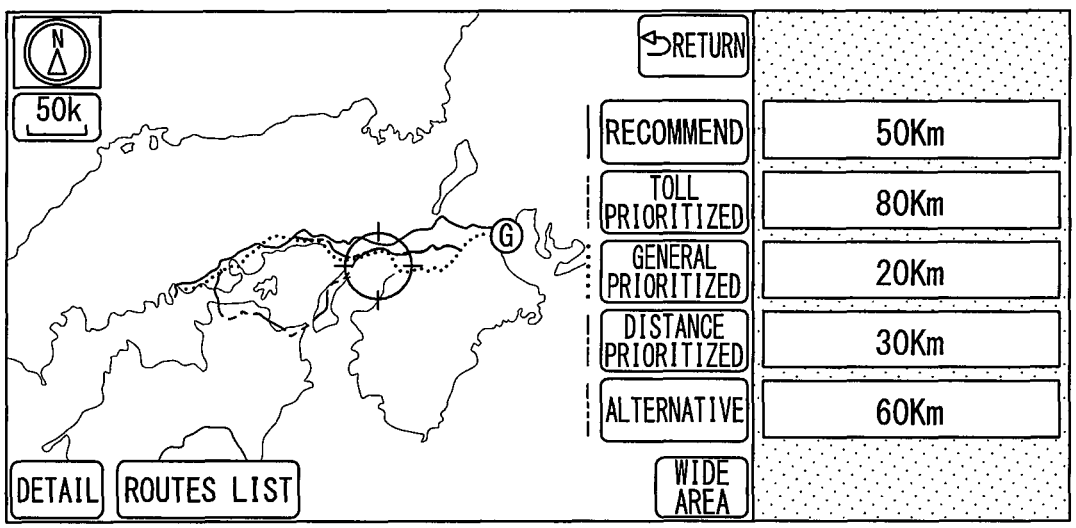
FIG. 6 is a diagram illustrating an example of a route selection screen view according to a modification example.

The above embodiment and the first modification example each describe an example of a configuration that displays, as the information on manual driving amount, a full length of each route candidate together with an automated driving enabled distance or a manual driving distance. However, there is no need to be limited thereto. For example, as indicated in FIG. 6, only an automated driving enabled distance may be displayed. Further, in contrast, only a manual driving distance may be displayed.

Furthermore, both an automated driving enabled distance and a manual driving distance may be displayed. The sum of an automated driving enabled distance and a manual driving distance is equivalent to a full length of each route candidate. Naturally, an automated driving enabled distance, a manual driving distance, and a full length may be each displayed.

Third Modification Example

The above describes an example of a configuration that illustrates a degree of the necessity of performing a manual driving as a concept of a distance, such as an automated driving enabled distance or a manual driving distance. There is no need to be limited thereto. The degree of the necessity of performing a manual driving may be expressed with a concept of a period of time. Such an example also provides an effect similar to that in the embodiment mentioned above.

Figure 7:
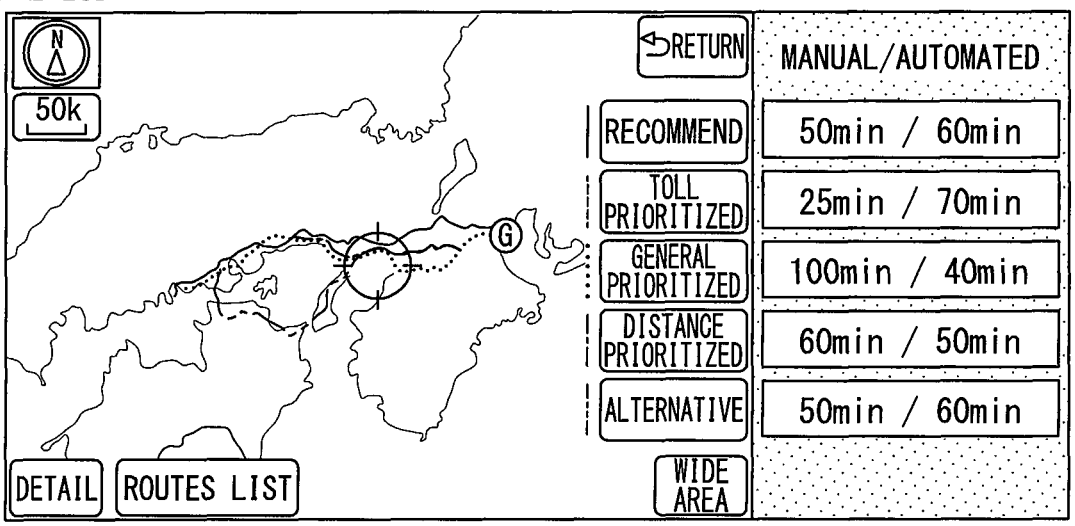
FIG. 7 is a diagram illustrating an example of a route selection screen view according to a modification example.

For example, as indicated in FIG. 7, the information on a manual driving amount may be displayed to be a predicted value of a period of time for which a travel with an automated driving is enabled (hereinafter, an automated driving period of time), and a predicted value of a travel period of time in road segments in which a travel of a manual driving is needed (hereinafter, a manual driving period of time).

An automated driving period of time is a period of time needed when a vehicle runs an automated driving compliant road with a cruising speed. This cruising speed may be a value suitably designed depending on an upper limit of a legal speed, or may be dynamically determined depending on an actual flow of traffic. An automated driving period of time may be a total value of periods of time needed for the respective links used as automated driving roads included in a route candidate. The period of time needed for a certain link used as an automated driving road is determined by dividing the length of the certain link by a cruising speed in the certain link. Assume a case where the cruising speed in an automated driving compliant road included in a route candidate has a constant value. Under such a case, the value obtained by dividing an automated driving enabled distance by the cruising speed is equivalent to an automated driving period of time.

A manual driving period of time may be a total value of periods of time needed for the respective links that are not automated driving roads included in a route candidate. The manual driving period of time needed for each link may be obtained similarly to an automated driving period of time. That is, the manual driving period of time needed for each link may be obtained by dividing the length of the link by the cruising speed in the link.

Further, the manual driving period of time may be obtained by subtracting an automated driving period of time from the total period of time needed. The total period of time needed may be calculated by a known method. The sum of an automated driving period of time and a manual driving period of time is equivalent to a total period of time needed when the route candidate is adopted. An automated driving period of time or a manual driving period of time may desirably include a period of time needed for passing through each node included in the route. The calculation of an automated driving period of time or a manual driving period of time may be performed by either the automated driving distance calculator section F4 or the display processor section F6. It is supposed that the automated driving distance calculator section F4 performs the calculation, for instance.

Incidentally, FIG. 7 illustrates an example of a configuration that displays a manual driving period of time and an automated driving period of time as the information on manual driving amount. There is no need to be limited thereto. The information on manual driving amount may be displayed to be either (i) a manual driving period of time and a total period of time needed, or (ii) an automated driving period of time and a total period of time needed. Furthermore, the information on manual driving amount may be displayed to be a manual driving period of time, an automated driving period of time, and a total period of time needed. Naturally, only either an automated driving period of time or a manual driving period of time may be displayed.

In addition, the degree of the necessity of performing a manual driving for each route candidate may be expressed using a ratio occupied by a manual driving period of time against a total period of time needed. The ratio may be expressed numerically or graphically, such as using a circle graph.

Fourth Modification Example

In addition, the display processor section F6 may display an automated driving enabled distance, an automated driving period of time, a manual driving distance, and a manual driving period of time, on a host-vehicle route selection screen view, which is used in a host vehicle mounted with an automated driving function, as the information on manual driving amount. That is, the degree of the necessity of performing a manual driving for each route candidate may be expressed with both the length of a distance and the length of a period of time.

Fifth Modification Example

Figure 8:
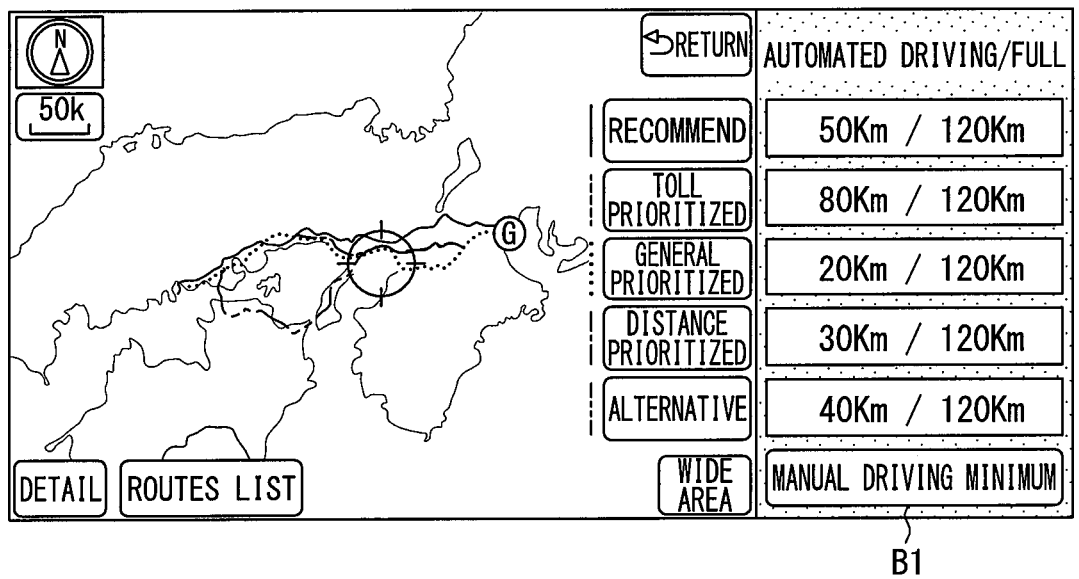
FIG. 8 is a diagram illustrating an example of a route selection screen view according to a modification example.

Further, as illustrated in FIG. 8, a host-vehicle route selection screen view, which is used in a host vehicle mounted with an automated driving function, may display a manual driving minimum button B1 in addition to the route selection buttons. The manual driving minimum button B1 is a button for selecting a route candidate having a minimum necessity (i.e., work) for performing a manual driving among a plurality of route candidates. The manual driving minimum button B1 is equivalent to a minimum route selection button.

Such a route candidate having a minimum necessity for performing a manual driving among a plurality of route candidates may be a route candidate having a minimum manual driving period of time. Naturally, a route candidate having a minimum manual driving distance may be regarded as a route candidate having a minimum necessity for performing a manual driving among a plurality of route candidates.

For convenience, a route candidate having a minimum necessity of performing a manual driving among a plurality of route candidates will be referred to as a load minimum route. A manual driving distance or a manual driving period of time is determined depending on an automated driving enabled distance; thus, a route candidate serving as a load minimum route among a plurality of route candidates may be also determined depending on an automated driving enabled distance for each route candidate.

Figure 9:
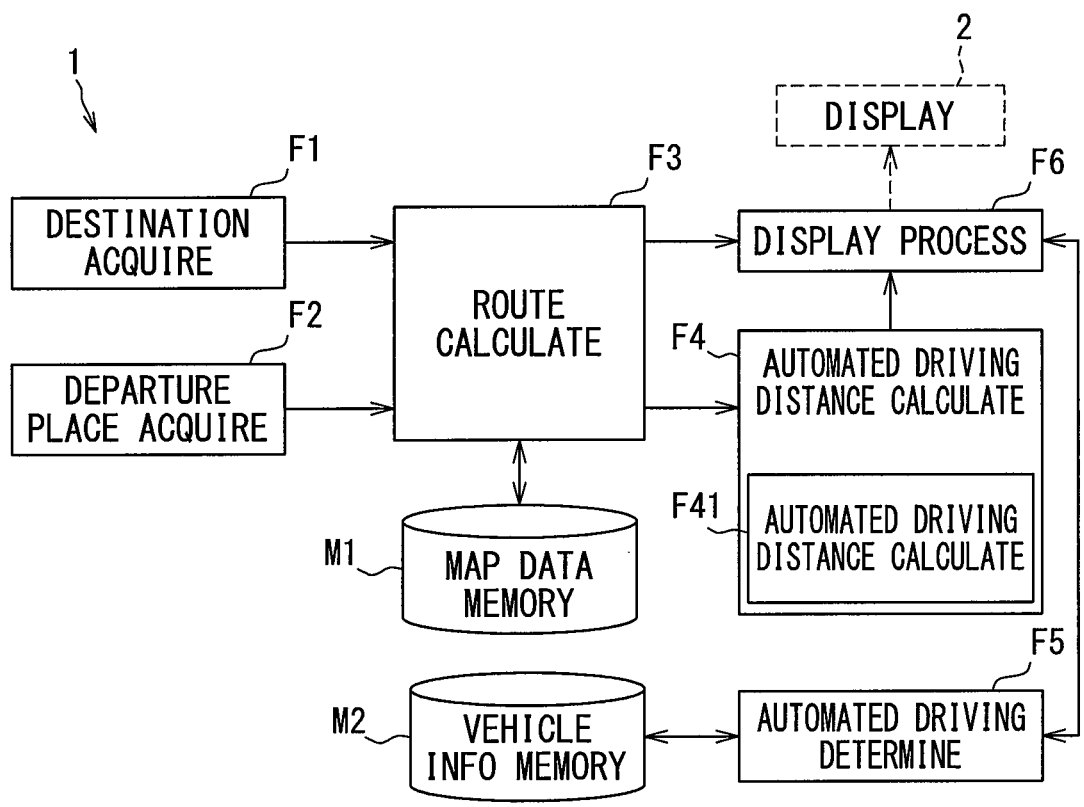
FIG. 9 is a functional block diagram illustrating a configuration of a navigation ECU according to a modification example.

A navigation ECU 1 corresponding to the present fifth modification example may be achieved with a configuration indicated in FIG. 9, for example. A minimum route identifier section F41 included in an automated driving distance calculator section F4 is provided as a functional block which identifies a load minimum route among a plurality of route candidates calculated by the route calculator section F3.

The present example describes a configuration in which a minimum route identifier section F41 is included in an automated driving distance calculator section F4. However, there is no need to be limited thereto. The minimum route identifier section F41 may be at least provided in the navigation ECU 1. In addition, suppose a case where a navigation system is provided with a server Srv, to be explained in a ninth modification example. In such a case, the server Sry may include a minimum route identifier section F41.

The navigation ECU 1 of the present fifth modification operates as follows, for example. The navigation ECU 1 collaborates with the input apparatus 4. When detecting that the manual driving minimum button B1 is selected by a user while a route selection screen view is displayed, a planned travel route is designated as a load minimum route by the minimum route identifier section F41 from among a plurality of route candidates. Subsequent process such as a guidance of the planned travel route is then performed, for example.

According to such a configuration, a user is enabled to designate a planned travel route as a route candidate having a minimum necessity of performing a manual driving among a plurality of route candidates by only performing a manipulation which selects a manual driving minimum button B1. This allows the selection of a route that is reduced in respect of the necessity for performing a manual driving easily, as compared with the above embodiment.

Sixth Modification Example

Incidentally, the above fifth modification example describes an example of a configuration that displays a manual driving minimum button B1 and the information on manual driving amount for each route candidate in the route selection screen view. However, there is no need to be limited thereto. When selecting a manual driving minimum button B1, the user is enabled to automatically select a route candidate having a minimum necessity of performing a manual driving. This reduces the necessity of displaying the information on manual driving amount for each of the route candidates.

That is, when a manual driving minimum button B1 is displayed, the information on manual driving amount for each route candidate is not needed to be displayed. This configuration also allows the user to select a route that is reduced relatively in respect of the necessity for performing a manual driving.

Seventh Modification Example

The above describes an example of a configuration that displays individually the different route selection screen views depending on whether or not a subject vehicle is a host vehicle mounted with an automated driving function. However, there is no need to be limited thereto. The information on manual driving amount may be displayed regardless whether or not a subject vehicle is a host vehicle mounted with an automated driving function. That is, an automated driving determiner section F5 need not be included.

Eighth Modification Example

The above describes an example of a configuration that achieves a navigation system according to the present disclosure using a navigation ECU 1 which is mounted in a vehicle. However, there is no need to be limited thereto. A navigation system may be achieved by a portable navigation terminal which may be brought into a vehicle. In addition, a navigation system according to the present disclosure may be functioned as by installing the navigation program on a known smart phone or tablet terminal.

When a navigation system is achieved using a portable unit such as a portable navigation terminal or a smart phone, the display included in the portable navigation terminal or the smart phone is equivalent to a display. That is, the display is not limited to one mounted in a vehicle, but may be one that is brought into a vehicle by a user.

Ninth Modification Example

Figure 10:
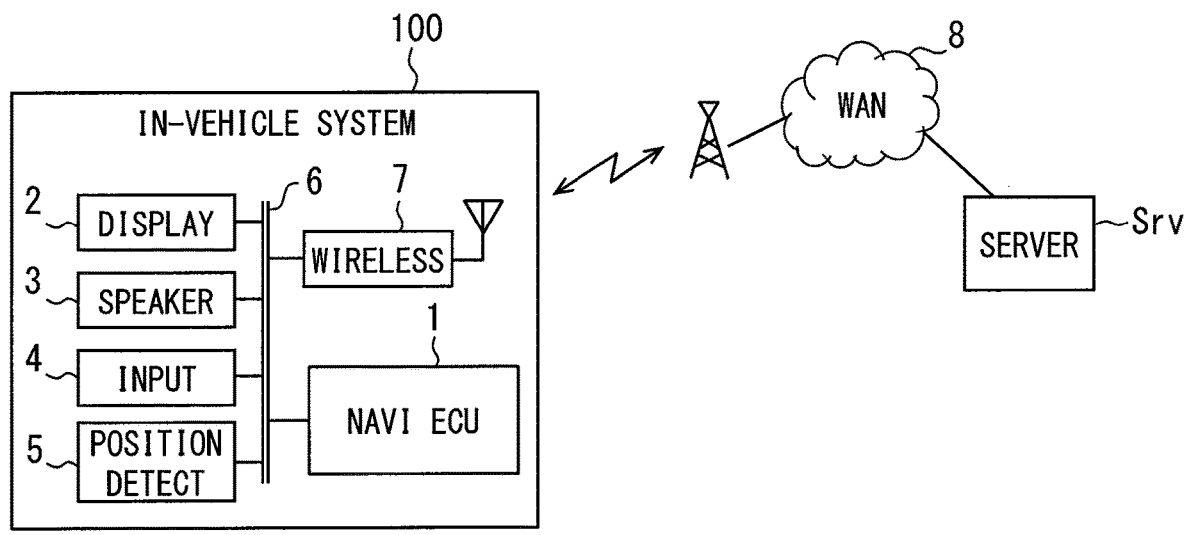
FIG. 10 is a block diagram illustrating a schematic configuration of a navigation system according to a modification example.

With reference to FIG. 10, part of functions included in the above-mentioned navigation ECU 1 may be provided in a server Srv. This server Sry may be provided in a position external to a vehicle to communicate with the navigation ECU 1 via a wide area communication network 8. For example, the server Sry may be provided with a route calculator section F3, an automated driving distance calculator section F4, or a map data memory M1. That is, the navigation system according to the present disclosure may be achieved using a navigation ECU 1 and a server Srv.

The present ninth modification example assumes that an in-vehicle system 100 includes a wireless communication apparatus 7 for accessing the wide area communication network 8 while a navigation ECU 1 is connected with a wireless communication apparatus 7 via a LAN 6.

In the present ninth modification example, the navigation ECU 1 and the server Sry may operate as follows. First, the navigation ECU 1 transmits the data, which indicate a departure place acquired by a departure place acquirer section F2 and a destination acquired by a destination acquirer section F1, to the server Srv. A route calculator section F3 included in the server Sry calculates a plurality of route candidates based on the destination and departure place which are transmitted from the navigation ECU 1. An automated driving distance calculator section F4 in the server Sry calculates an automated driving enabled distance with respect to each of the route candidates while generating the information on manual driving amount determined based on the automated driving enabled distance. The server Sry then transmits, as a reply, the route information and the information on manual driving amount for each of the route candidates to the navigation ECU 1.

Upon receiving the route information and the information on manual driving amount for each route candidate from the server Srv, the display processor section F6 in the navigation ECU 1 generates a host-vehicle route selection screen view for a host vehicle mounted with an automated driving function, thereby displaying the generated view on a display 2. Naturally, when an automated driving determiner section F5 determines that a subject vehicle is not an automated driving compliant vehicle, a non-host-vehicle route selection screen view for a non-host vehicle in which none of an automated driving function is mounted.

The configuration of the ninth modification example also provides an advantageous effect similar to that of the above-mentioned embodiment. In addition, the configuration of the present ninth modification example can also reduce a function or a storage capacity that is included in the navigation ECU 1 used in a vehicle.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

What is claimed is:

1. A navigation system that displays candidates of routes to a destination, which is designated by a user, on a display in a vehicle, the navigation system comprising:
    a destination acquirer section configured to acquire the destination;
    a departure place acquirer section configured to acquire a departure place of the vehicle;
    a route calculator section configured to calculate a plurality of routes as route candidates from the departure place acquired by the departure place acquirer section to the destination acquired by the destination acquirer section;
    an automated driving compliant road memory configured to store data that indicate automated driving compliant roads on which running by an automated driving is permitted;
    an automated driving distance calculator section configured to calculate an automated driving enabled distance that is a distance of automated driving compliant roads that are included in each of the plurality of routes, based on the data stored in the automated driving compliant road memory; and
    a display processor section configured to display on the display a route selection screen view used in order that the user selects a route adopted as a planned travel route from the plurality of routes calculated by the route calculator section, the route selection screen view illustrating information on the plurality of routes, the display processor section being further configured to display, in the route selection screen view, information on a manual driving amount with respect to each of the plurality of routes, the manual driving amount being represented by a numerical value, the information on the manual driving amount represented by the numerical value being determined depending on the automated driving enabled distance calculated by the automated driving distance calculator section with respect to each of the plurality of routes, the information on manual driving amount represented by the numerical value being used in order that the user recognizes a distance or a period of time for performing a manual driving in each of the plurality of routes.

2. The navigation system according to claim 1, further comprising:
    an automated driving determiner section configured to determine whether the vehicle is provided with an automated driving function to perform an automated driving, wherein
    in response to the automated driving determiner section determining that the vehicle is not provided with an automated driving function, the display processor section prevents the information on the manual driving amount represented by the numerical value with respect to each of the plurality of routes from being displayed in the route selection screen view.

3. The navigation system according to claim 1, wherein the display processor section displays, as the information on the manual driving amount represented by the numerical value with respect to each of the plurality of routes in the route selection screen view, at least either (i) the automated driving enabled distance or (ii) a manual driving distance that is a distance, which is within each of the plurality of routes and is needed by the user to perform the manual driving.

4. The navigation system according to claim 1, wherein the display processor section displays,
as the information on the manual driving amount represented by the numerical value with respect to each of the plurality of routes in the route selection screen view,
(a) a full length of each of the plurality of routes and
(b) at least either (i) the automated driving enabled distance or (ii) a manual driving distance that is a distance, which is within each of the plurality of routes and is needed by the user to perform the manual driving.

5. The navigation system according to claim 1, wherein the display processor section displays, as the information on the manual driving amount represented by the numerical value with respect to each of the plurality of routes in the route selection screen view, at least either (i) a manual driving period of time that is a predicted value of a period of time for performing the manual driving in each of the plurality of routes, or (ii) an automated driving period of time that is a predicted value of a period of time for performing an automated driving in each of the plurality of routes.

6. The navigation system according to claim 1, wherein the display processor section is configured to display a minimum route selection button in the route selection screen view,
in response to the minimum route selection button being actuated, the display processor section is further configured to display a route from the plurality of routes with a minimum distance or minimum period of time for performing the manual driving.

7. The navigation system according to claim 1, wherein the display processor section displays, as the information for the manual driving amount represented by the numerical value with respect to each of the plurality of routes in the route selection screen view,
(a) a full length of each of the plurality of routes, and
(b) a manual driving distance within each of the plurality of routes, and wherein
the numerical value includes the full length of each of the plurality of routes and a corresponding manual driving distance for each of the plurality of routes, and wherein
the full length of each of the plurality of routes is displayed side by side with a corresponding manual driving distance for each of the plurality of routes to provide a comparison of each of the plurality of routes.

8. The navigation system according to claim 1, wherein the display processor section is further configured to display a minimum route selection button in the route selection screen view in addition to the information on the manual driving amount with respect to each of the plurality of routes and represented by the numerical value, and
in response to the minimum route selection button being actuated, the display processor section is further configured to display a route from the plurality of routes with a minimum distance or minimum period of time for performing the manual driving.

9. A navigation system that displays candidates of routes to a destination, which is designated by a user, on a display in a vehicle, the navigation system comprising:
a destination acquirer section configured to acquire the destination;
a departure place acquirer section configured to acquire a departure place of the vehicle;
a route calculator section configured to calculate a plurality of routes as route candidates from the departure place acquired by the departure place acquirer section to the destination acquired by the destination acquirer section;
an automated driving compliant road memory configured to store data that indicate automated driving compliant roads on which driving by an automated driving is permitted;
an automated driving distance calculator section configured to calculate an automated driving enabled distance that is a distance of automated driving compliant roads that are included in each of the plurality of routes calculated by the route calculator section, based on the data stored in the automated driving compliant road memory;
a minimum route identifier section configured to identify a load minimum route among the plurality of routes based on the automated driving enabled distance with respect to each of the plurality of routes calculated by the automated driving distance calculator section, the load minimum route being a route in which either a distance or a period of time for performing a manual driving is minimum among the plurality of routes; and
a display processor section configured to display on the display a route selection screen view for the user to select a route adopted as a planned travel route from the plurality of routes calculated by the route calculator section, the display processor section being further configured to display a minimum route selection button in the route selection screen view, and in response to the minimum route selection button being actuated, the display processor section is further configured to display the load minimum route identified by the minimum route identifier section among the plurality of routes.

10. The navigation system according to claim 9, wherein the route selection screen view displayed by the display processor section on the display includes information on the plurality of routes in addition to the minimum route selection button.

11. The navigation system according to claim 10, wherein the information in the route selection screen view is represented by a numerical value for a manual driving amount with respect to each of the plurality of routes, the information represented by the numerical value for the manual driving amount being determined depending on the automated driving enabled distance calculated by the automated driving distance calculator section with respect to each of the plurality of routes, the information represented by the numerical value for the manual driving amount for displaying a distance or a period of time for performing a manual driving in each of the plurality of routes.

* * * * *